(12) United States Patent
Yamazaki

(10) Patent No.: US 6,778,767 B2
(45) Date of Patent: Aug. 17, 2004

(54) SHAKE CORRECTING DEVICE, IMAGE PICKUP APPARATUS, SHAKE CORRECTING METHOD, PROGRAM FOR IMPLEMENTING THE METHOD, STORAGE MEDIUM STORING THE PROGRAM

(75) Inventor: Tatsuya Yamazaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/350,958

(22) Filed: Jan. 24, 2003

(65) Prior Publication Data
US 2003/0147636 A1 Aug. 7, 2003

(30) Foreign Application Priority Data
Jan. 25, 2002 (JP) .................................. 2002-016774

(51) Int. Cl.[7] ........................ G03B 17/00; H04N 5/228; H04N 3/14
(52) U.S. Cl. ................... 396/55; 348/208.13; 348/294
(58) Field of Search .................... 348/208.16, 208.6, 348/208.12, 208.13, 294; 396/55

(56) References Cited

U.S. PATENT DOCUMENTS 5,497,192 A * 3/1996 Ishizuka ............... 348/208.13

* cited by examiner

Primary Examiner—Russell Adams
Assistant Examiner—Arthur A. Smith
(74) Attorney, Agent, or Firm—Robin, Blecker & Daley

(57) ABSTRACT

There is provided a shake correcting device that can prevent white defects of an image pickup unit from moving around on a display screen, thereby eliminating unsightliness of displays in correcting shakes of subject images, according to image signals that are output by the image pickup unit that converts the subject images into video signals. When an image stabilizing ON/OFF switch of a microcomputer of an image pickup apparatus is set to ON, and the image pickup apparatus is not in a static mode, if a level signal with a higher level than a predetermined reference level signal from a detection signal generating section, is input from a camera signal processing section to a comparison circuit of a white defect detecting section, then the white defect detecting section detects white defects in a CCD as the image pickup unit, and the microcomputer controls an image stabilizing operation to be set in the OFF state.

20 Claims, 10 Drawing Sheets

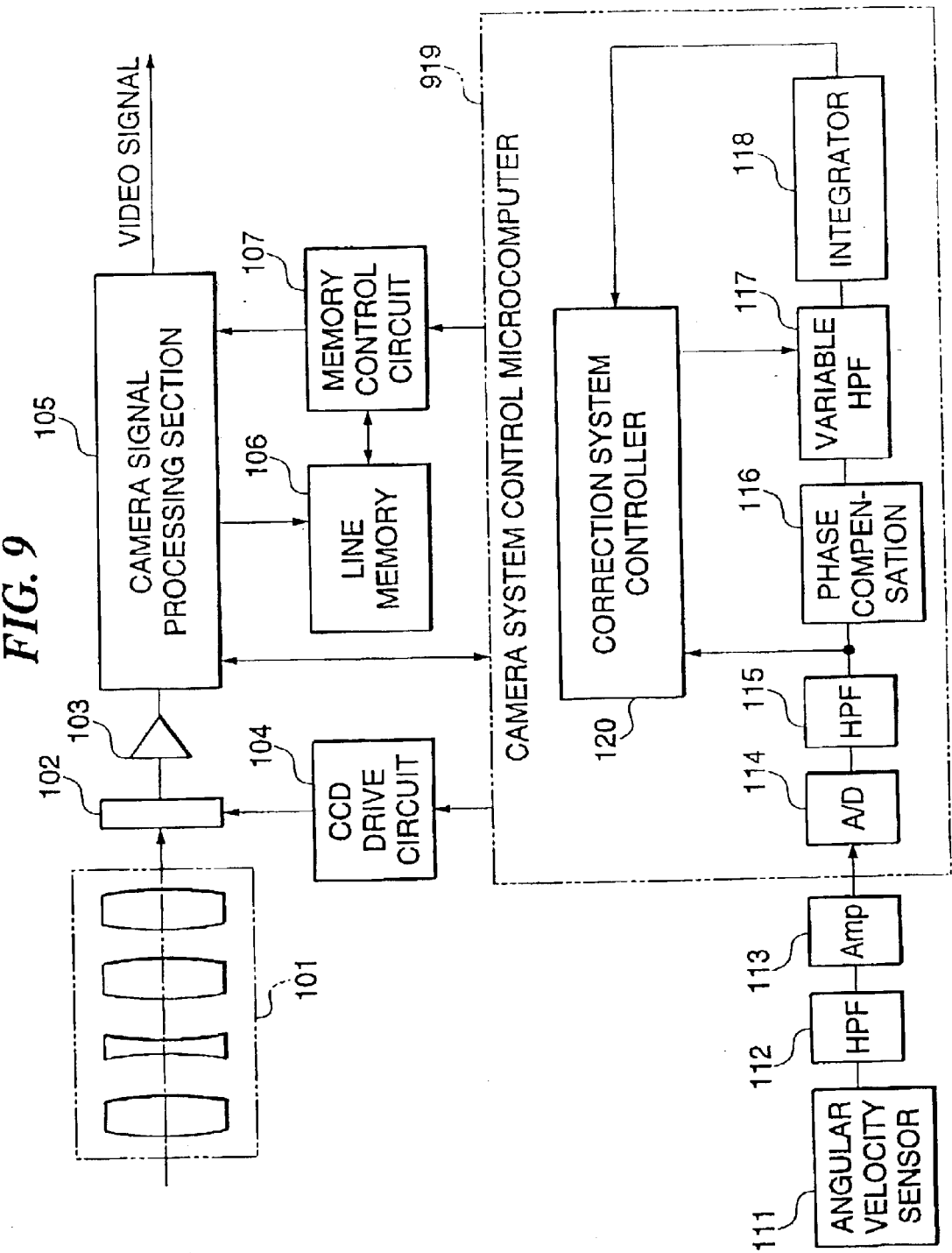

SHAKE CORRECTING DEVICE, IMAGE PICKUP APPARATUS, SHAKE CORRECTING METHOD, PROGRAM FOR IMPLEMENTING THE METHOD, STORAGE MEDIUM STORING THE PROGRAM

BACKGROUND OF THE INVENTION

1. Field of the Invention

The present invention relates to a shake correcting device, an image pickup apparatus, a shake correcting method, a program for performing, and a storage medium storing the program, and more particularly relates to a shake correcting device, an image pickup apparatus, a shake correcting method, a program for performing, and a storage medium storing the program, which are suitable for preventing such a phenomenon that white defects move around on a display screen of a camera or a video camera or the like having an electronic shake correcting unit mounted thereon.

2. Description of the Related Art

Conventional image stabilizing systems as employed in apparatuses such as video cameras include a type that detects shakes of the apparatus by an angular velocity sensor, uses an image pickup element, having more pixels than a standard image pickup element required by television broadcasting systems, and extracts preselected areas with the standard size of broadcasting systems from within the entire image pickup area of the image pickup element, according to shakes of the apparatus detected by the angular velocity sensor. A shake correcting device employing this type of image stabilizing system will be further described.

FIG. 8 is a schematic diagram showing an image of the image pickup area of an image pickup element. In the figure, reference numeral 601 designates the entire image pickup area of the image pickup element, and reference numerals 602 to 604 designate areas with the standard size of broadcasting systems. When performing no shake corrections, an area 603 positioned in the center of the entire image pickup area is extracted, selecting from the three areas, 602 to 604, and thus a video image is output. When performing a correction, a video image is output, extracted from an area selected from the entire image pickup area 601, but with a deviation, for example, to the area 602 or the area 604, in order to remove a shake of the apparatus, according to a signal from a unit for detecting shakes, not shown. With regard to the position of an area to be extracted, there is no limitation as long as the area extracted lies within the entire area 601, and the area can even be extracted from an arbitrary position within the entire area 601.

FIG. 9 is a block diagram showing, as an conventional example, the configuration of an image pickup apparatus portion of a video camera that has a shake correcting device of the area extraction system, described above, as a shake correcting unit, using an angular velocity sensor as a shake detection unit. An image pickup apparatus having a shake correcting device mounted thereon will be described below with reference to FIG. 9. In the figure, reference numeral 101 designates a lens unit, and reference numeral 102 designates a charge coupled device (CCD). A subject image is formed on the CCD 102 by the lens unit 101, and then photoelectrically converted by the CCD 102. The CCD 102 has more pixels than the standard CCDs required by broadcasting systems (for example, NTSC (National Television System Committee)). Reference numeral 104 designates a CCD drive circuit for driving the CCD 102. The CCD drive circuit 104 is designed to be able to select lines with respect to the direction V (the number of lines) in FIG. 8, described above, from the lines in the entire image pickup area of the CCD 102 in order to extract an area for a final output, wherein the selection is made upon a control instruction from a microcomputer 919 for camera system control, described later.

The reference numeral 601 in FIG. 8, mentioned above, designates the entire image size, and the reference numerals 602 to 604 designate examples with the standard image size according to broadcasting systems. In FIG. 8, when the lines starting from ya+1, which is Δya lines below the uppermost line, are effective for example, the Δya lines are read at a high speed, and thereafter the lines from ya+1 line are read out in the same timing as the case of using a CCD with the standard size with respect to a vertical synchronizing signal. Then, the remaining Δyb lines are read out again at a high speed, thus practically extracting lines of the standard image size with respect to the direction V.

Upon a control instruction from the microcomputer 919, the CCD drive circuit 104 controls the accumulating time of the signal charge in the CCD 102, thereby implementing an electronic shutter. Specifically, a high speed shutter is implemented by setting the accumulating time of the signal charge in the CCD 102 short, and a slow shutter is implemented by setting the accumulating time, described above, long.

Reference numeral 103 designates an analog signal processing section that performs a predetermined process on signals obtained from the CCD 102 to generate analogue image pickup signals. Specific examples of the analog signal processing section 103 are a CDS (Co-related Double Sampling) circuit, and an AGC (Automatic Gain Control) circuit. Reference numeral 106 designates a line memory that can store a digital image pickup signal for one line at least by a memory control circuit 107. Further, pixels can be read out from a predetermined address in the line memory 106 by the memory control circuit 107. Reference numeral 105 designates a camera signal processing section that has a built-in A/D converter and performs processing of digital signals to generate final output video signals. A digital image pickup signal stored in the line memory 106 includes more pixels than the standard image size of the CCD 102, keeping the large number of pixels. The memory control circuit 107 is designed to be able to select a top pixel to be read from the line memory 106, and to read pixels for the standard image size, upon a control instruction from the microcomputer 919, described in the following.

The microcomputer 919 performs control of the entire camera system including control of the CCD drive circuit 104, exposure control, white-balance control, variable power lens control, auto focus control, image stabilizing control. However, in FIG. 9, only a portion of these functions associated with shake correction is shown for brevity. Shake detection is performed with respect to the two axes in the pitch (vertical) direction and the yaw (horizontal) direction. Since the same control is performed for the two axes, FIG. 9 shows the control only for one direction. Reference numeral 111 designates an angular velocity sensor for detecting shakes of the camera. Reference numeral 112 designates a HPF (High Pass Filter) for cutting the DC component of angular velocity signals output from the angular velocity sensor 111. Reference numeral 113 designates an amplifier for amplifying angular velocity signals detected by the angular velocity sensor 111.

Reference numeral 114 designates an A/D converter incorporated into the microcomputer 919, which converts angular velocity signals in the two directions, described above, into digital signals to become angular velocity data. Further, a HPF 115 and a phase compensation filter 116 perform predetermined processes on this angular velocity data. The angular velocity data passes through a variable HPF 117. Then, an integrator 118 generates shake correction data for the vertical and horizontal directions. Reference numeral 120 designates a correction system controller, which corrects shakes according to outputs of the angular velocity sensor 111. The microcomputer 919 transmits data for correcting shakes in the vertical direction to the CCD drive circuit 104, and data for correcting shakes in the horizontal direction to the memory control circuit 107, respectively. As mentioned before, the CCD drive circuit 104 and the memory control circuit 107 change the position for extracting lines of the standard image size from the CCD 102, according to the respective data for correcting shakes.

Through this series of operations, lines of the standard image size, as designated by the reference numerals 602 or 604 for example, can be extracted from the entire image size 601 of the CCD 102, as shown in FIG. 8 described above, with a deviation from the center, which makes it possible to correct shakes caused by hand shakes or the like.

However, as will be described below, there has been a problem with the conventional image pickup apparatus, described above. When picking up an image by a slow shutter with a longer exposure time of the image pickup element than a single field period, the slower the shutter speed, the more apparent white defects in the image pickup apparatus (CCD) become. FIGS. 10A and 10B are diagrams showing white defects that appears in subject image field formed by image signals from the image pickup apparatus during electronic image stabilizing control. In FIG. 10A, symbols A, B, and C designate the white defects generated by a slow shutter. In the case that the image stabilizing control is performed in this state, when the extraction position of the standard image size lines is shifted, for example, 401→402→403 with respect to the entire image size 405, the white defects move around actually on a display screen 410 of the image pickup apparatus, as shown in FIG. 10B, causing a phenomenon that the display becomes very unsightly.

SUMMARY OF THE INVENTION

It is an object of the present invention to provide a shake correcting device, an image pickup apparatus, and a shake correcting method that can prevent white defects of an image pickup unit from moving around on a display screen, thereby eliminating unsightliness of displays in correcting shakes of subject images, according to image signals that are output by the image pickup unit that converts the subject images into video signals, as well as a program for performing the method and a storage medium storing the program.

To attain the above object, in a first aspect of the present invention, there is provided a shake correcting device for correcting a shake of a subject image, by processing an image signal which is output by an image pickup unit that converts the subject image into the image signal, the shake correcting device comprising an image pickup unit, and a control device that determines a state of white defects which appears in the subject image field formed by the image signal that stops a function of correcting a shake of the subject image when the state of the white defects is determined to be at a higher level than a predetermined level.

With the arrangement of the shake correcting device according to the first aspect, in correcting shakes of a subject image according to an image signal output by the image pickup unit that converts the subject image into an image signal, if the state of white defects in the image pickup unit is at a higher level than a predetermined level, then a shake correction function is stopped, and thus the white defects are kept from moving around on the display screen of the image pickup unit, thereby eliminating unsightliness of displays.

To attain the above object, in a second aspect of the present invention, there is provided a shake correcting device for correcting a shake of a subject image, by processing an image signal which is output by an image pickup unit that converts the subject image into the image signal, the shake correcting device comprising an image pickup unit, and a control device that stops a function of correcting a shake of the subject image when an image pickup time by the image pickup unit exceeds a predetermined period of time.

With the arrangement of the shake correcting device according to the second aspect, in correcting shakes of a subject image according to an image signal output by the image pickup unit that converts the subject image into an image signal, if an image pickup time of the image pickup unit exceeds a predetermined time, then the shake correction function is stopped, and thus the white defects are kept from moving around on the display screen of the image pickup unit, thereby eliminating unsightliness of displays.

Preferably, in the second aspect, the image pickup time of the image pickup unit is an electric charge accumulation time over which a light quantity of the subject image that is received by the image pickup unit is accumulated as an electric charge.

Further, to attain the above object, in a third aspect of the present invention, there is provided a comprising an image pickup unit that converts a subject image into an image signal, a shake correcting device that corrects a shake of the subject image, by processing an image signal which is output by an image pickup unit, the image pickup apparatus comprising the image pickup unit, and a control device that determines a state of white defects which appears in the subject image field formed by the image signal that stops a function of correcting a shake of the subject image when the state of the white defects are determined by the determining device to be at a higher level than a predetermined level.

With the arrangement of the image pickup apparatus according to the third aspect, a similar effect to that of the above first aspect can be obtained.

Still further, to attain the above object, in a fourth aspect of the present invention, there is provided an image pickup apparatus comprising a shake correcting device for correcting a shake of a subject image, by processing an image signal which is output by an image pickup unit that converts the subject image into the image signal, the an image pickup apparatus comprising the image pickup unit, and a control device that stops a function of correcting a shake of the subject image when an image pickup time by the image pickup unit exceeds a predetermined period of time.

Preferably, in the fourth aspect, the image pickup time of the image pickup unit is an electric charge accumulation time over which a light quantity of the subject image that is received by the image pickup unit is accumulated as an electric charge.

With the arrangement of the image pickup apparatus according to the fourth aspect, a similar effect to that of the above first aspect can be obtained.

To attain the above object, in a fifth aspect of the present invention, there is provided a shake correcting method for correcting a shake of a subject image, by processing an image signal which is output by an image pickup unit that converts the subject image into the image signal, the shake correcting method comprising determining a state of white defects which appears in the subject image field formed by the image signal, and stopping a function of correcting a shake of the subject image when the state of the white defects is determined in the determining step to be at a higher level than a predetermined level.

With the shake correcting method according to the fifth aspect, a similar effect to that of the above first aspect can be obtained.

To attain the above object, in a sixth aspect of the present invention, there is provided a shake correction method for correcting a shake of a subject image, by processing an image signal which is output by an image pickup unit that converts the subject image into the image signal, the shake correction method comprising stopping a function of correcting a shake of the subject image when an image pickup time of the image pickup unit exceeds a predetermined period of time.

With the shake correcting method according to the sixth aspect, a similar effect to that of the above first aspect can be obtained.

To attain the above object, in a seventh aspect of the present invention, there is provided a program for implementing a shake correction method for correcting a shake of a subject image, by processing an image signal which is output by an image pickup unit that converts the subject image into the image signal, the program comprising a determining module for determining a state of white defects which appears in the subject image field formed by the image signal, and a control module for stopping a function of correcting a shake of the subject image when the state of the white defects is determined to be at a higher level than a predetermined level.

To attain the above object, in an eighth aspect of the present invention, there is provided a program for implementing a shake correction method for correcting a shake of a subject image, by processing an image signal which is output by an image pickup unit that converts the subject image into the image signal, the program comprising a control module for stopping a function of correcting a shake of the subject image when an image pickup time of the image pickup unit exceeds a predetermined period of time.

To attain the above object, in a ninth aspect of the present invention, there is provided a computer-readable storage medium storing a program for implementing a shake correction method for correcting a shake of a subject image, by processing an image signal which is output by an image pickup unit that converts the subject image into the image signal, wherein the program comprises a determining module for determining a state of white defects which appears in the subject image field formed by the image signal, and a control module for stopping a function of correcting a shake of the subject image when the state of the white defects is determined to be at a higher level than a predetermined level.

To attain the above object, in a tenth aspect of the present invention, there is provided a computer-readable storage medium storing a program for implementing a shake correction method for correcting a shake of a subject image, by processing an image signal which is output by an image pickup unit that converts the subject image into the image signal, wherein the program comprises a control module for stopping a function of correcting a shake of the subject image when an image pickup time of the image pickup unit exceeds a predetermined period of time.

The above and other objects of the invention will become more apparent from the following drawings taken in conjunction with the accompanying drawings.

BRIEF DESCRIPTION OF THE DRAWINGS

FIG. 9 is a block diagram showing the configuration of a conventional image pickup apparatus;

FIGS. 10A and 10B are a diagrams showing white defects occurring during electronic image stabilizing control, wherein FIG. 10A is a diagram showing white defects in a CCD created by a slow shutter, and FIG. 10B is a diagram showing how the white defects are moving about on a display screen.

DESCRIPTION OF THE PREFERRED EMBODIMENTS

The present invention will now be described in detail below with reference to the accompanying drawings showing preferred embodiments thereof.

According to the present embodiments, when it is detected that white defects of an image pickup element (white defects that appears in subject image field formed by image signals from the image pickup apparatus) become prominent in an image pickup apparatus, image stabilizing operation is stopped in order to stop the movement of the white. Further, a shutter speed at and below which clear defects are expected to become apparent is set in advance in order that when the shutter speed becomes equal to or lower than the preset shutter speed, described above, the image stabilizing operation is stopped, and thus the movement of white defects is stopped.

First Embodiment

Figure 1:
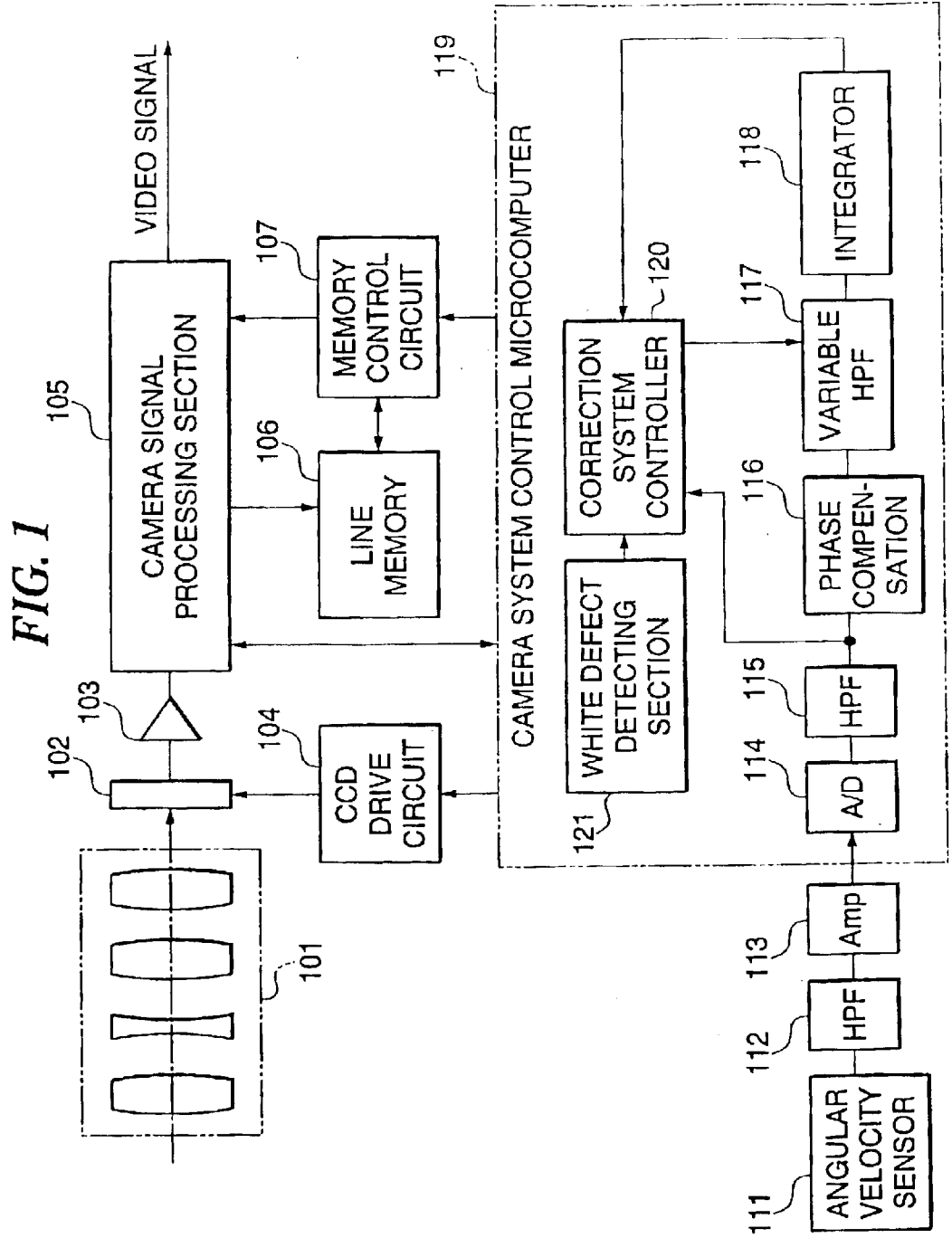
FIG. 1 is a block diagram showing the configuration of an image pickup apparatus according to a first embodiment of the present invention.

FIG. 1 is a block diagram showing the configuration of an image pickup apparatus portion of a video camera according to a first embodiment of the present invention. The image pickup apparatus is comprised of a lens unit 101, a charge coupled device (CCD) 102, an analog signal processing section 103, a CCD drive circuit 104, a camera signal processing section 105, a line memory 106, a memory control circuit 107, an angular velocity sensor 111, a HPF 112, an amplifier 113, and a microcomputer 119 for camera system control. Further, the microcomputer 119 is comprised of an A/D converter 114, a HPF 115, a phase compensation filter 116, a variable HPF 117, an integrator 118, a correction system controller 120, and a white defect detecting section 121.

In FIG. 1, elements provided with the same functions as those in FIG. 9 are designated by the same reference numerals, and description of these elements is omitted or abridged for clarity. With regard to the configuration of essential parts or elements of the image pickup apparatus, the white defect detecting section 121 detects the condition of white defects of the CCD 102, information from which is designed to be input to the correction system controller 120. The lens unit 101 forms a subject image onto a predetermined position of the CCD 102. The CCD 102 is comprised of a plurality of photoelectric conversion elements that convert the subject image formed by the lens unit 101 into an electric signal. The CCD 102 accumulates signal charges according to the light quantity of the subject image, having an image pickup screen with a size larger than the standard image size to be output as an image pickup screen.

The CCD drive circuit 104 controls accumulation of signal charges by the CCD 102 and reading out of the accumulated signal charges. The angular velocity sensor 111 detects shakes given to or experienced by the image pickup apparatus. The correction system controller 120 of the microcomputer 119 corrects shakes according to an output of the angular velocity sensor 111. From pixels in an effective circle of the CCD 102 (a part within which the subject image is securely formed on the CCD 102), the correction system controller 120 selects a range for image reading to be output as an image pickup screen, thereby correcting shakes. The microcomputer 119 performs processes shown in the flowcharts in FIGS. 3 to 5, according to a control program stored inside the image pickup apparatus or a program provided from outside the image pickup apparatus.

Figure 2:
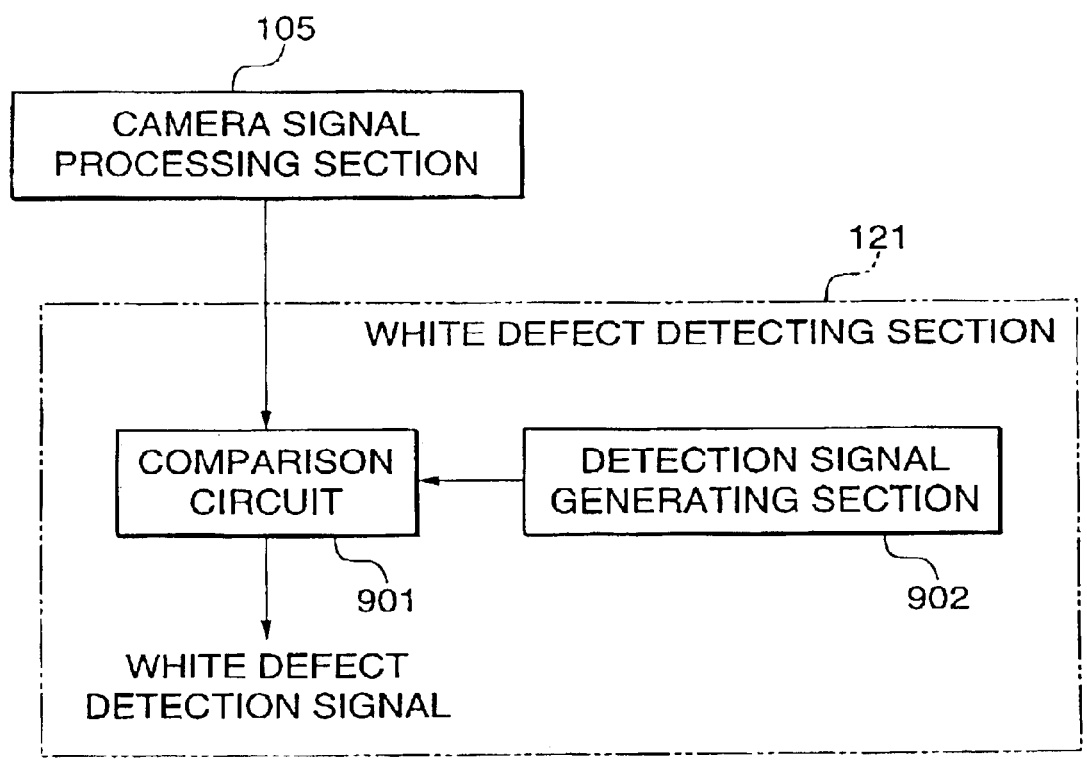
FIG. 2 is a block diagram showing the configuration of a white defect detecting section of the image pickup apparatus.

FIG. 2 is a block diagram showing the configuration of the white defect detecting section 121 of the image pickup apparatus. In the figure, the part enclosed by chain lines is the white defect detecting section 121 described above, and reference numeral 105 designates the camera signal processing section 105, described above. The white defect detecting section 121 is comprised of a detection signal generating section 902 that generates a predetermined reference level signal for detecting white defects in the CCD 102, and a comparison circuit 901 for comparing a signal from the camera signal processing section 105 with a signal from the detection signal generating section 902.

Detection of white defects will be explained with reference to FIG. 2. The camera signal processing section 105 converts an output signal from the CCD 102 from analog to digital and transmits the resulting signal as a digital signal to the microcomputer 119. This digital signal is input to the comparison circuit 901 of the white defect detecting section 121 in the microcomputer 119. On the other hand, the predetermined reference level signal from the detection signal generating section 902 of the white defect detecting section 121 is also input to the comparison circuit 901. The comparison circuit 901 determines which is the largest of the two input signals. As a result of the determination of the largest signal, when a signal with a higher level than that of the predetermined reference level signal from the detection signal generating section 902 is input from the camera signal processing section 105, the comparison circuit 901 determines that the CCD 102 has white defects and generates a white defect detection signal.

Figure 3:
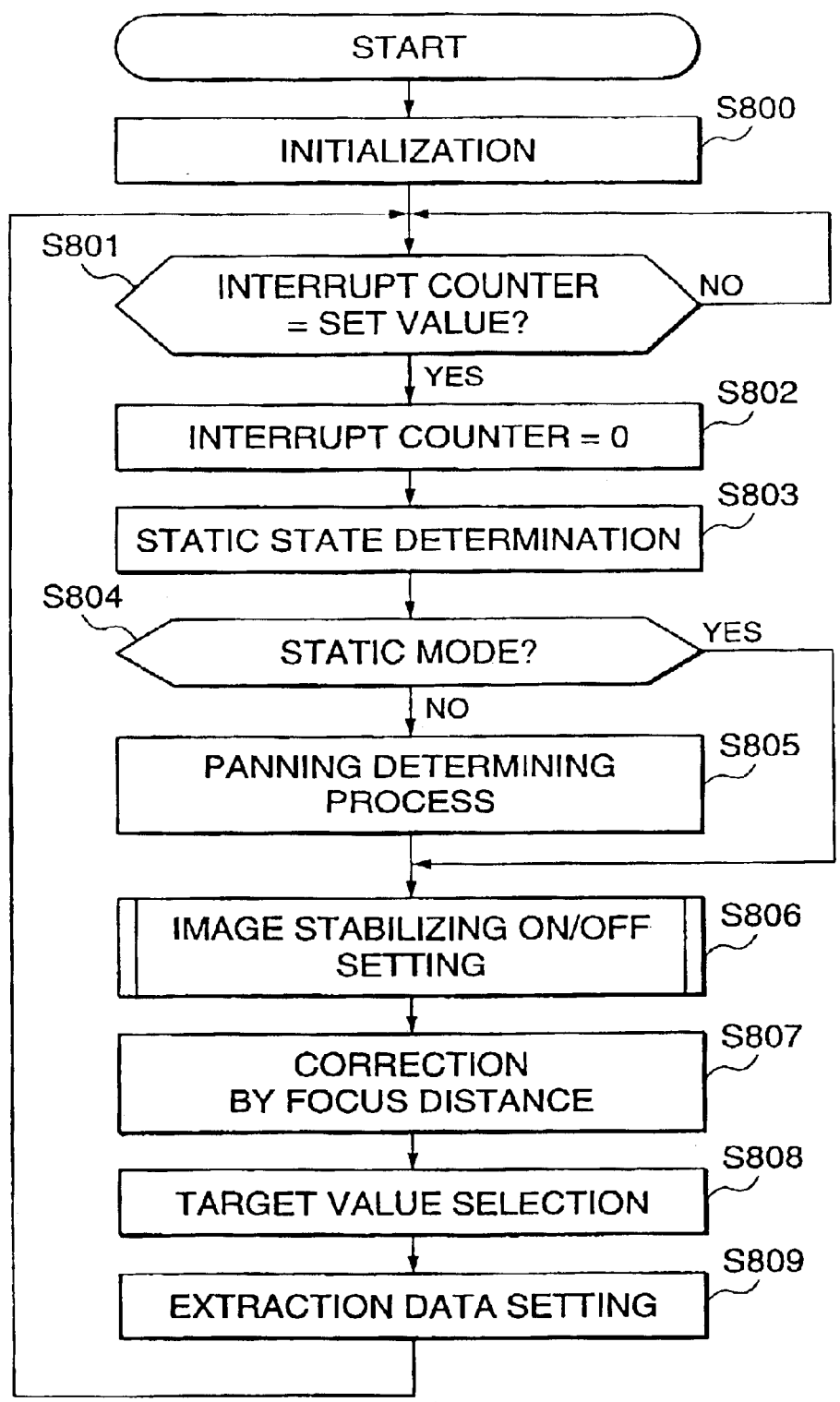
FIG. 3 is a flowchart showing a main process of an electronic image stabilizing control according to the first embodiment.
Figure 4:
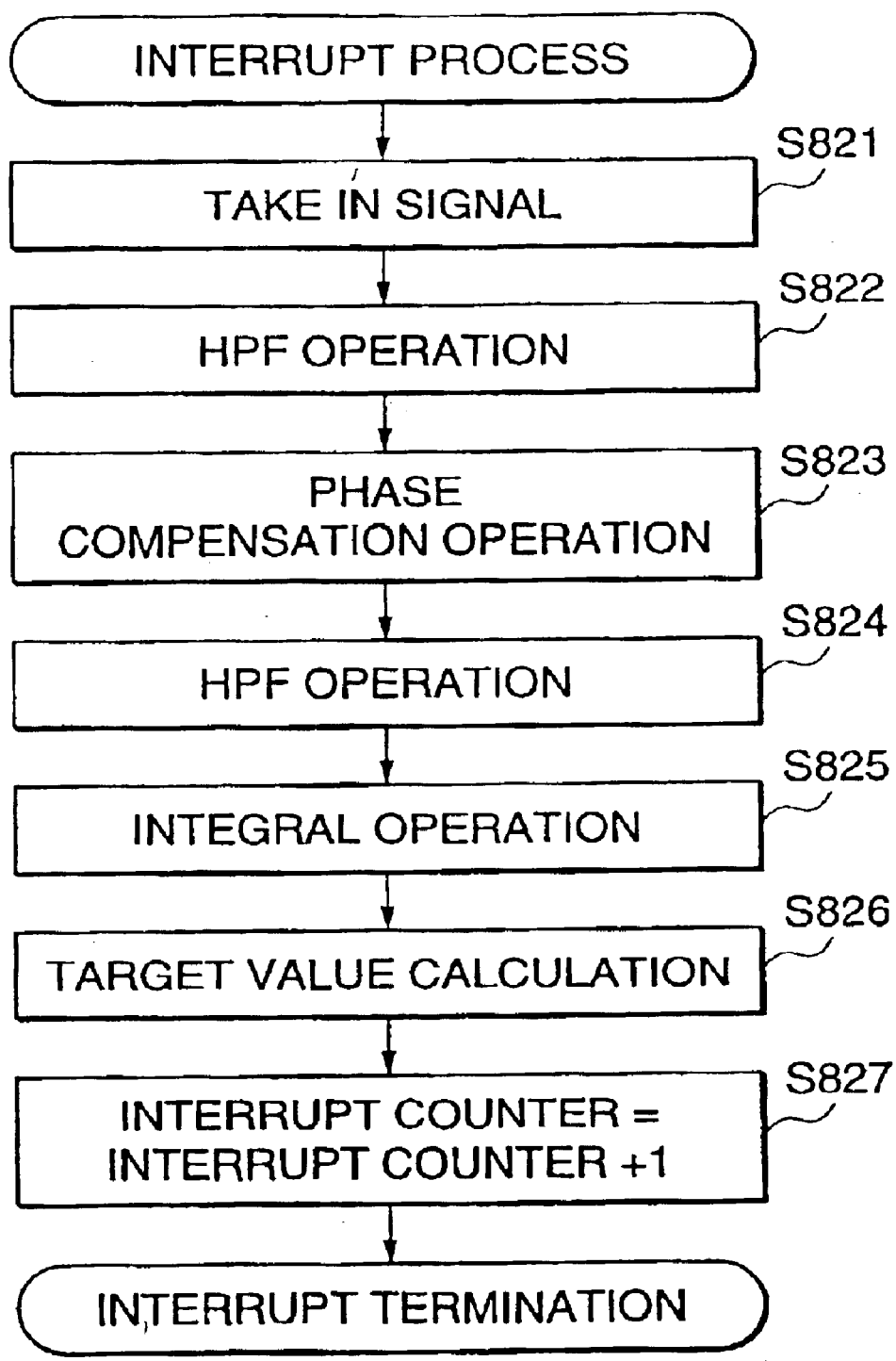
FIG. 4 is a flowchart showing an interrupt process of the electronic image stabilizing control.
Figure 5:
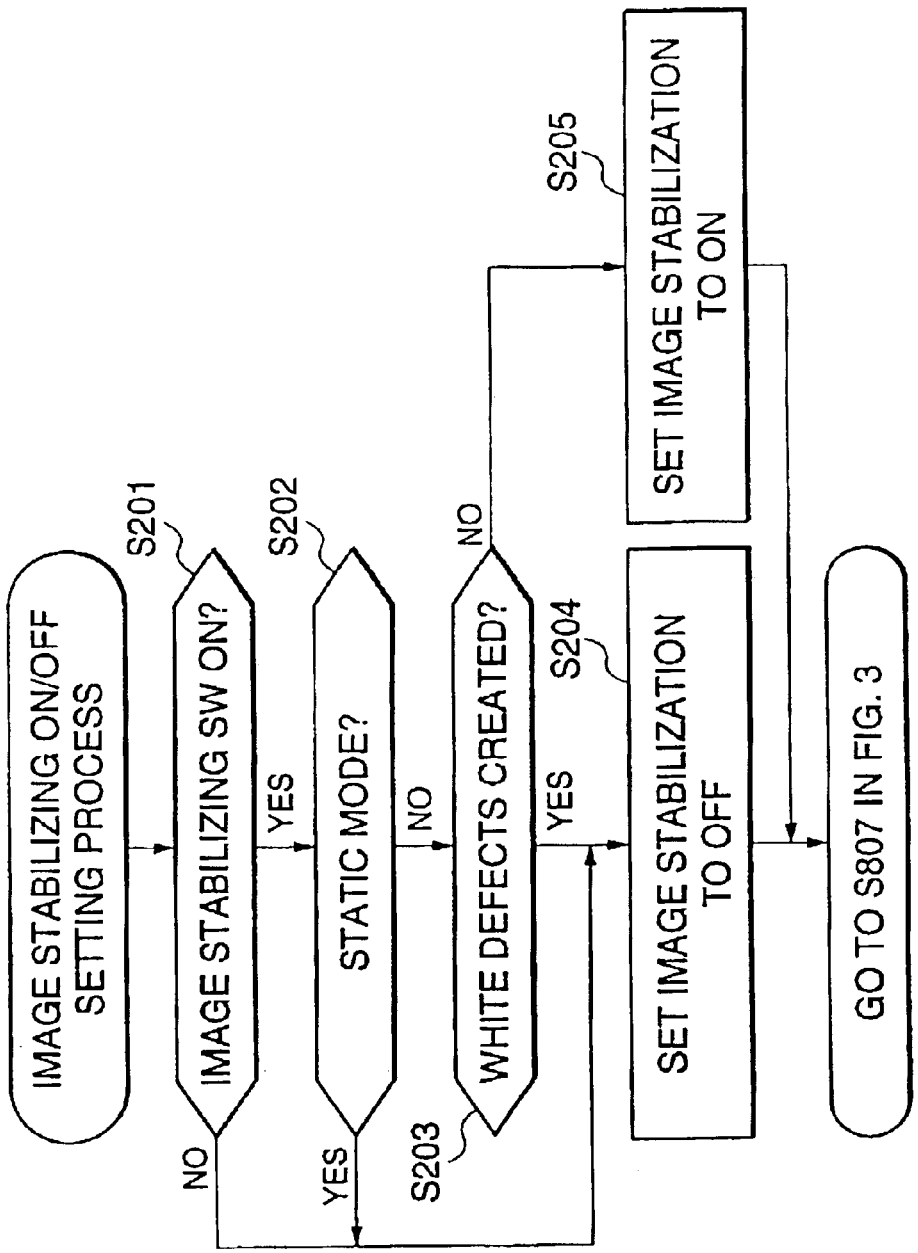
FIG. 5 is a flowchart showing an ON/OFF setting process of the electronic image stabilizing control.

Next, the operation of the image pickup apparatus according to the present embodiment, configured as mentioned above, will be described with reference to FIGS. 1 to 5. Specifically, FIGS. 3 and 4 are flowcharts showing an electronic image stabilizing control performed by the microcomputer 119, and FIG. 5 is a flowchart showing an ON/OFF setting process of the electronic image stabilizing control according to the present embodiment. The processes shown by the flowcharts in FIGS. 3 to 5 are executed by the microcomputer 119 according to a control program stored inside the image pickup apparatus or a control program provided from outside the image pickup apparatus.

Steps S800 to S809 in FIG. 3 constitute a main process, while steps S821 to S827 in FIG. 4 constitute an interrupt process. The main process is executed once during the vertical synchronization period of a television signal. In FIG. 3, the step S800 is initialization, and is carried out when power is supplied to the image pickup apparatus. In the step S800, the microcomputer 119 carries out setting of an interrupt period of the interrupt process to the main process, and the like. Next, in the step S801, the microcomputer 119 determines whether an interrupt counter (not shown) inside the microcomputer has reached a set value or not. Before the interrupt process has been executed a predetermined number of times (the interrupt counter has reached the set value), the value of the interrupt counter is incremented to wait before execution of the next step S802.

The interrupt process depends on the capability of the microcomputer 119, and performed with a timer, for example, of a frequency such as 900 Hz or 480 Hz. The frequency is set such that it synchronizes with the main process executed once during the vertical synchronization period. In FIG. 4, an output signal of shake gyro is taken in the step S821, which corresponds to the process performed by the A/D converter 114 in FIG. 1. The step S822 in FIG. 4 performs a HPF operation (the operation by the HPF 115 in FIG. 1), the step S823 performs a phase compensation operation (the operation by the phase compensation filter 116 in FIG. 1), the step S824 performs a variable HPF operation (the operation by the variable HPF117 in FIG. 1) that allows change of the cutoff frequency, and the step S825 performs an integration operation (the operation by the integrator 118 in FIG. 1). Next, in the step S826, according to the data taken in by the interruption occurring at this time, a target value of the extraction amount of lines of the standard image size of the CCD 102 is calculated. Then, in the step S827, the interrupt counter described above counts the number of interrupts and terminates the interrupt process. When the interrupt process has been executed a predetermined number of times (the set value has been reached), the main process proceeds from the step S801 to the step S802 in FIG. 3.

Coming back to FIG. 3, in step S802, the microcomputer 119 clears the interrupt counter, and then in step S803, determines whether or not the image pickup apparatus is in a static state, according to an output of the angular velocity sensor 111. The determination of the static state means a determination as to whether or not the image pickup apparatus is fixed, for example, to a tripod. Then, in step S804, the microcomputer 119 checks the result of the determination as to whether or not the image pickup apparatus is in a static state in the step S803 described above. If it is determined that the image pickup apparatus is in a static state, then the microcomputer 119 judges that the image pickup apparatus is in a static mode, and the process proceeds to step S806.

If it is determined that the image pickup apparatus is not in a static state, then the microcomputer 119 judges that the image pickup apparatus is not in the static mode, and carries out a panning determining process in step S805. The panning determining process determines whether or not the image pickup apparatus is in a panning state, and if the image pickup apparatus is in a panning state, then the process performs, as a panning control, processing such as changing the cutoff frequency of the variable HPF 117 that allows a change of the cutoff frequency as described above, and the like, description of details of which is omitted. Next, in step S806, ON/OFF setting for the image stabilizing operation is carried out. Details of the process in the step S806 are shown in FIG. 5.

In step S201 in. FIG. 5, the microcomputer 119 determines the state of an image stabilizing ON/OFF switch (not shown) installed in the image pickup apparatus, for example, mounted on a video camera. If the image stabilizing ON/OFF switch is set to OFF, then the image stabilizing operation is set in the OFF state in the step S204. If the image stabilizing ON/OFF switch is set to ON, then in step S202, the microcomputer 119 determines whether the image pickup apparatus is in the static mode that has been determined in the step S804 in FIG. 3.

If the image pickup apparatus is in the static mode, then the microcomputer 119 sets the image stabilizing operation in the OFF state also in the step S204. If the image stabilizing ON/OFF switch is set to ON and the image pickup apparatus is not in the static mode, then the microcomputer 119 determines whether there are white defects created in the CCD 102, according to the information from the white defect detecting section 121 in step S203. If there are no white defects created in the CCD 102, then the microcomputer 119 sets the image stabilizing operation in the ON state in step S205. If there are white defects created in the CCD 102, then the microcomputer 119 sets the image stabilizing operation in the OFF state in the step S204.

Coming back to FIG. 3 after ON/OFF setting for the image stabilizing operation has been carried out as described above, in step S807, the microcomputer 119 corrects the target value of the extraction amount of lines of the standard image size of the CCD 102, according to a focus distance. The reason why the correction of the target value described above is carried out according to the focus distance is because the extraction amount of lines of the standard image size of the CCD 102 for shake correction is calculated according to focus distance×tan(correction angle).

Next, in step S808, the microcomputer 119 selects target value data of the extraction amount of lines of the standard image size of the CCD 102. Calculation of the target value data has been carried out during the interrupt period, though actual shake correction is carried out with the period of the vertical synchronization period of a television signal. Therefore, the selection, as to which target data is to be used, out of a plurality of count values of the interrupt counter, is made, for example, by switching according to the shutter speed so that the best image stabilizing characteristic can be obtained according to each shutter speed. When the image stabilizing operation is set in the OFF state by the ON/OFF setting for the image stabilizing operation (step S806), the target value data of the extraction amount of lines of the standard image size of the CCD 102 is fixed as the central data of the values of the interrupt counter. Then, in step S809, an extraction data setting is carried out on the CCD drive circuit 104 and the memory control circuit 107.

By the processes described above, the image stabilizing operation is normally carried out in principle. Only when, however, white defects in the CCD 102 are detected, the image stabilizing operation is set in the OFF state, thereby keeping white defects from moving around due to the image stabilizing operation, which could occur when white defects are created in the CCD 102.

As described above, according to the first embodiment of the present invention, when white defects in the CCD 102 are detected, the image stabilizing operation is stopped to keep the white defects from moving around on the screen, which, prior to the present invention, used to occur, thus eliminating unsightliness of displays.

Second Embodiment

Figure 6:
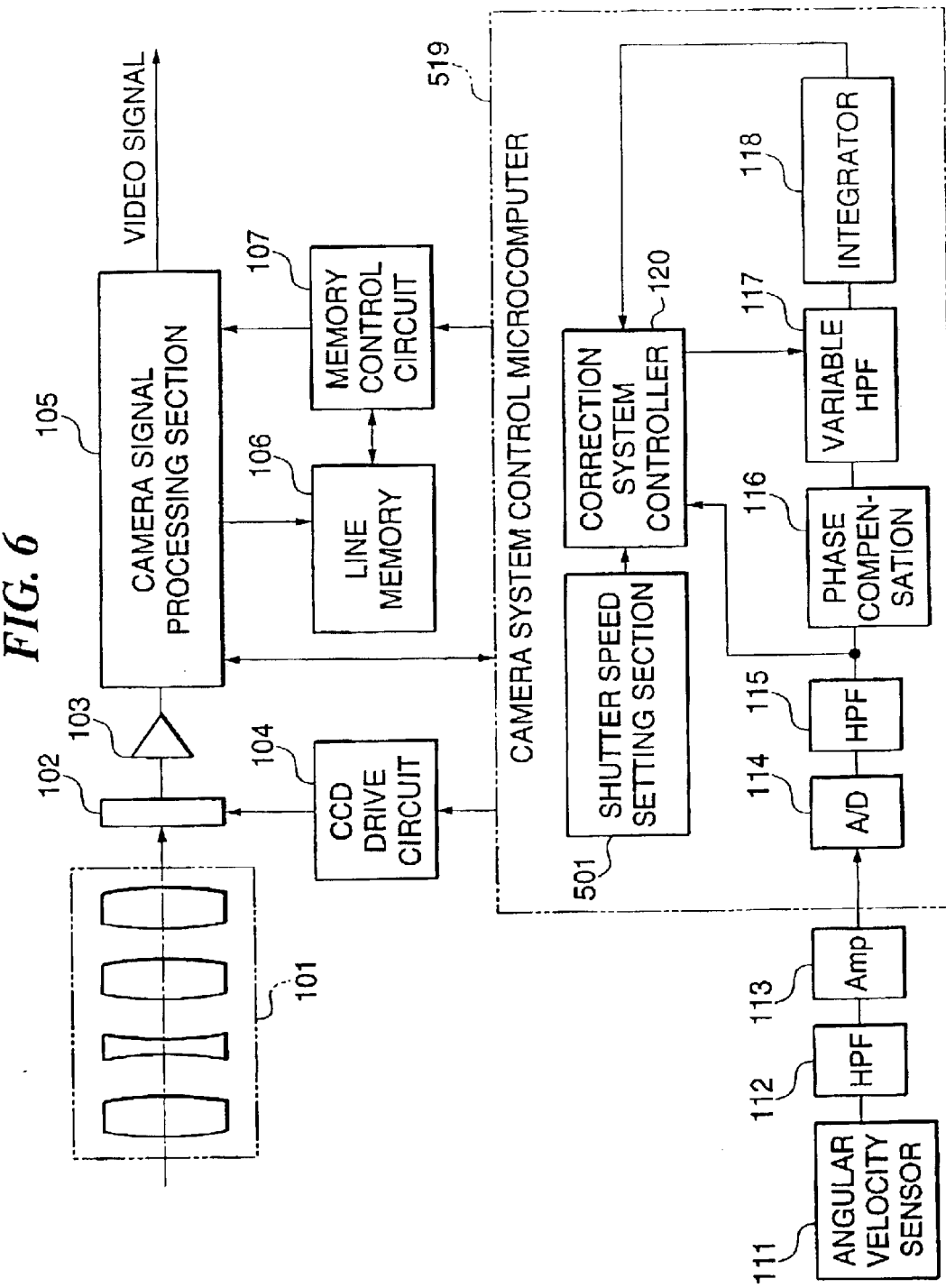
FIG. 6 is a block diagram showing the configuration of an image pickup apparatus according to a second embodiment of the present invention.

FIG. 6 is a block diagram showing the configuration of an image pickup apparatus according to a second embodiment of the present invention. The image pickup apparatus is comprised of a lens unit 101, a charge coupled device (CCD) 102, an analog signal processing circuit 103, a CCD drive circuit 104, a camera signal processing section 105, a line memory 106, a memory control circuit 107, an angular velocity sensor 111, a HPF 112, an amplifier 113, and a microcomputer 519 for camera system control. The microcomputer 519 is further comprised of an A/D converter 114, a HPF 115, a phase compensation filter 116, a variable HPF 117, an integrator 118, a correction system controller 120, and a shutter speed setting section 501.

In FIG. 6, the same reference numerals are given to elements having the same functions as those in FIG. 9, described before, and description thereof is omitted. The main configuration of the image pickup apparatus according to the second embodiment is different from that of the image pickup apparatus according to the first embodiment in that information from the shutter speed setting section 501, provided in the microcomputer 519, that controls setting of a shutter speed to get a proper exposure is read into the correction system controller 120. The microcomputer 519 performs processes shown in the flowcharts in FIGS. 3, 4, and 7, according to a control program stored inside the image pickup apparatus or provided from outside the image pickup apparatus. Description of the processes shown in the flowcharts in FIGS. 3 and 4 will be understood from the description of the first embodiment and therefore, are omitted for reasons of redundancy.

Figure 7:
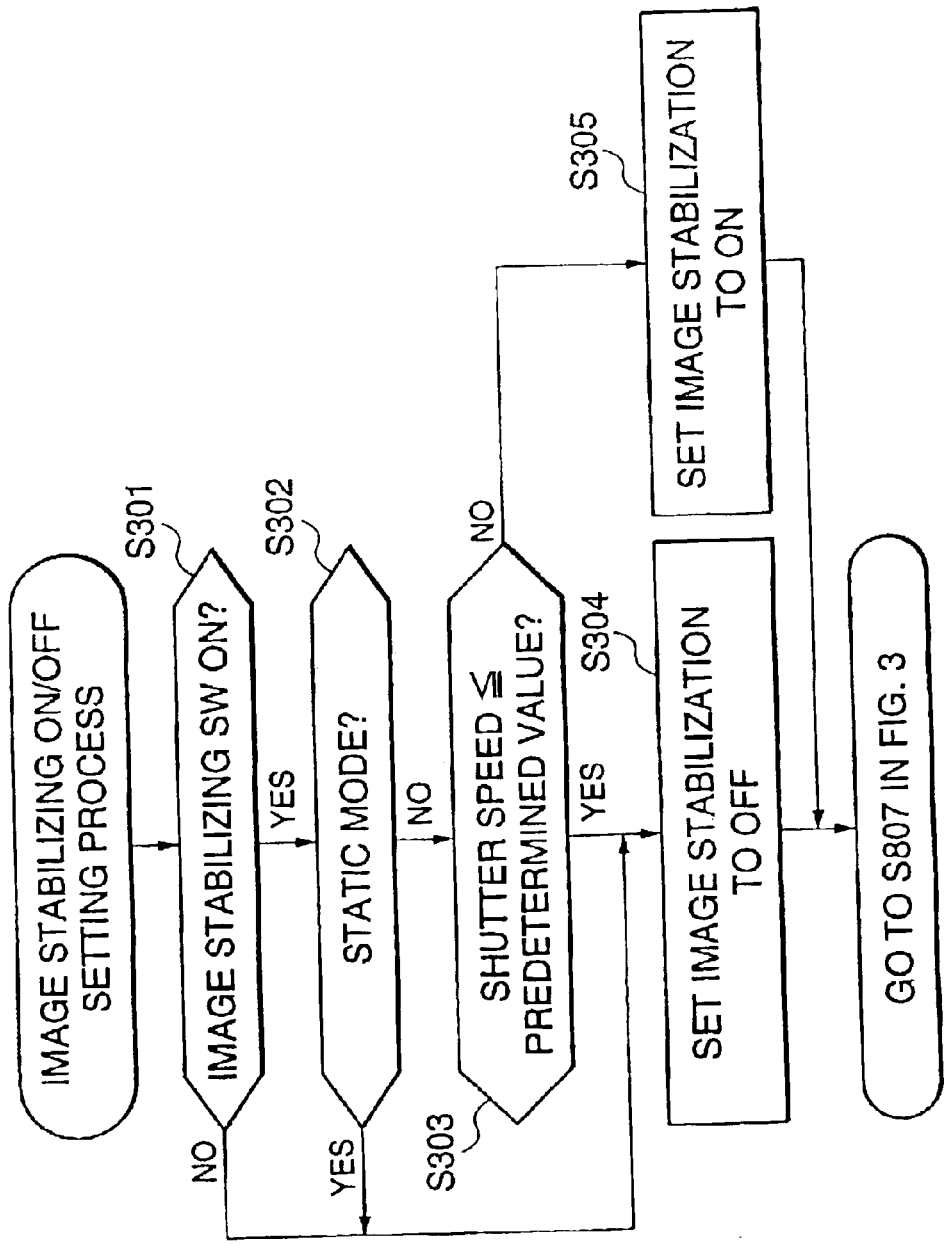
FIG. 7 is a flowchart showing an ON/OFF setting process of an electronic image stabilizing control according to the second embodiment.
Figure 8:
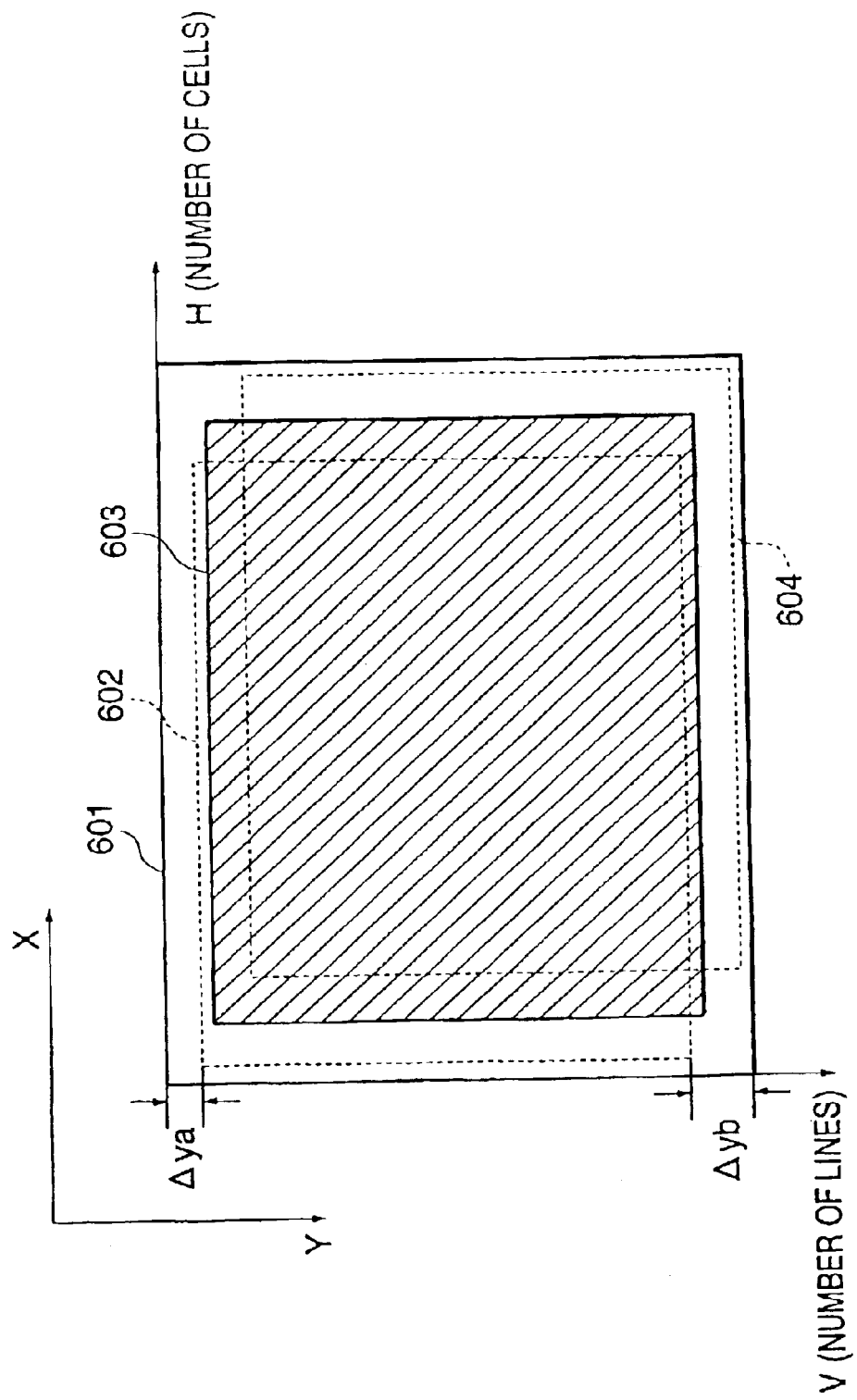
FIG. 8 is a diagram showing the extraction of an area with the standard size for broadcasting systems from an image pickup area of an image pickup element during electronic image stabilizing control according to prior art.
Figure 10A:
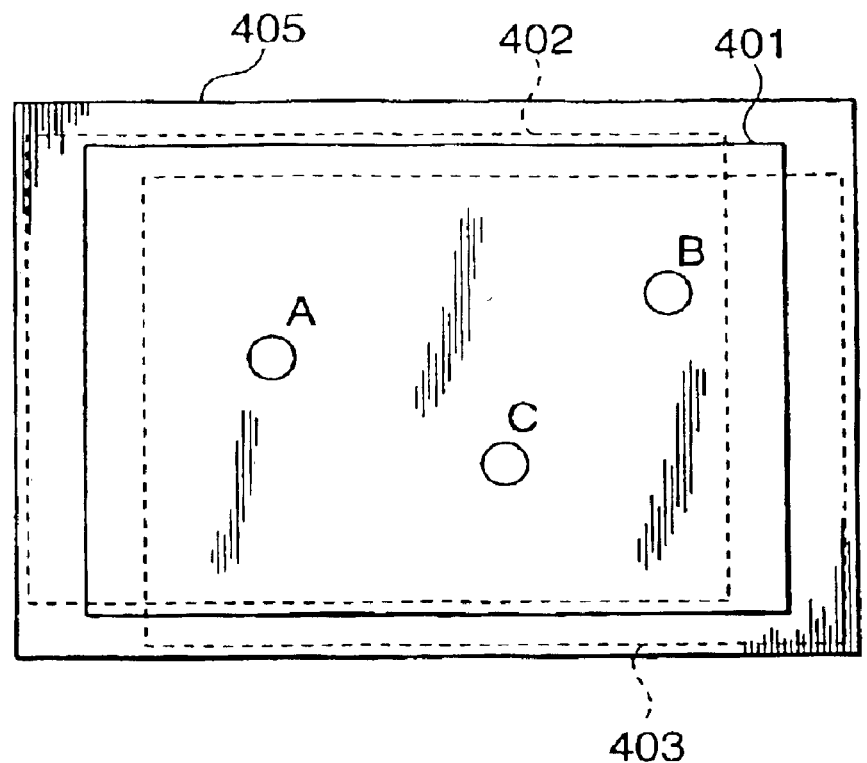
Figure 10B:
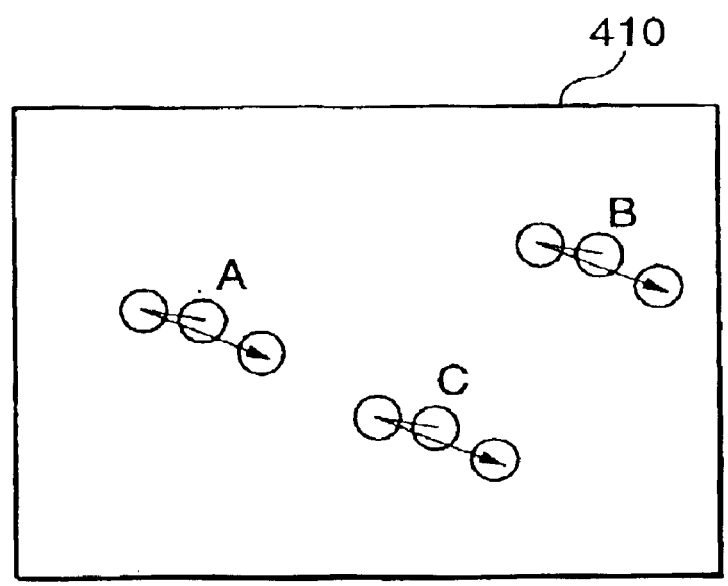

Next, the operation of the image pickup apparatus configured as described above, according to the second embodiment will be described with reference to FIGS. 6 and 7. FIG. 7 is a part of a flowchart showing the process performed by the microcomputer 519, which shows an ON/OFF setting process for switching ON/OFF of the electronic image stabilizing control executed by the step S806 in FIG. 3, described above. The process shown in the flowchart in FIG. 7 is performed by the microcomputer 519 according to a control program stored inside the image pickup apparatus or a control program provided from outside the image pickup apparatus.

In FIG. 7, in step S301, the microcomputer 519 determines the state of an image stabilizing ON/OFF switch installed on the image pickup apparatus, for example, mounted on a video camera. If the image stabilizing ON/OFF switch is set to OFF, then the image stabilizing operation is set in the OFF state by the microcomputer 519 in step S304. If the image stabilizing ON/OFF switch is set to ON, then in step S302, the microcomputer 519 determines whether or not the image pickup apparatus is in a static mode, that is, as determined in the step S803 in FIG. 3, described above.

If the image pickup apparatus is in the static mode, then the microcomputer 519 sets the image stabilizing operation in the OFF state also in the step S304 If the image pickup apparatus is not in the static mode in the step S302, and the shutter speed according to the information from the shutter speed setting section 501 is determined in step S303 to be higher than a preselected shutter speed (a predetermined value) at and below which white defects are expected to be created in the CCD 102, then the microcomputer 519 set the image stabilizing operation in the ON state in step S305. If the shutter speed according to the information from the shutter speed setting section 501 is determined to be equal to or lower than the preset shutter speed (the predetermined value), then the microcomputer 519 set the image stabilizing operation in the OFF state in the step S304.

By the above mentioned process, only when the shutter speed is equal to or less than the preset shutter speed at and below which white defects are expected to be created in the CCD 102, is the image stabilizing operation set to OFF, thereby keeping white defects from moving around due to the image stabilizing operation, which previously could have occurred when white defects had been created in the CCD 102.

As described above, according to the second embodiment of the present invention, the image stabilizing operation is stopped at a shutter speed equal to or lower than the shutter speed at and below which white defects in the CCD 102 becomes apparent, to keep white defects from moving around on the screen, thus producing eliminating unsightliness of displays.

Although in the first and second embodiments described above, when white defects are detected or when the shutter speed is not higher than a preselected speed at and below which white defects can occur in the CCD 102, the image stabilizing operation is inhibited, the image stabilizing operation may not be completely stopped, but the present invention may be achieved even with an arrangement that the image stabilizing operation is carried out to some limited extent, for example.

Further, in the first and second embodiments, image pickup apparatuses as used in video cameras, which are configured as shown in FIGS. 1 and 6, are given by way of example. The present invention, however, is not limited to this construction, and can readily be enabled using an arbitrary configuration with regard to the configuration of an image pickup optical system, a signal processing system, and the like.

Still further, in the first and second embodiments, examples are given in which the present invention is applied to single image pickup apparatus as used in video cameras. The present invention, however, is not limited to this arrangement, and it is possible to apply the invention to any system which is comprised of an image pickup apparatus according to the invention, and a display unit such as a liquid crystal display and/or an information processing apparatus such as a personal computer, and in which they are connected with each other for communication there between.

Still yet further, in the first and second embodiments, examples are given in which the present invention is applied to a video camera having an electronic shake correcting unit mounted therein. The present invention, however, is not limited to this construction, and it is possible to apply the invention to a digital camera that can operate an electronic shake correcting unit at a slow shutter speed.

It is to be understood that the object of the present invention may also be accomplished by supplying a system or an apparatus with a storage medium in which a program code of software which is encoded and realizes the functions of any of the above described embodiments is stored, and causing a computer (or CPU or MPU) of the system or apparatus to read out and execute the program code stored in the storage medium.

In this case, the program code itself that is read from the storage medium realizes the functions of any of the embodiments above described, and thus the storage medium storing the program code constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, a ROM, and a download via a network.

Further, it is to be understood that the functions of any of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A shake correcting device for correcting a shake of a subject image, by processing an image signal which is output by an image pickup unit that converts the subject image into the image signal, the shake correcting device comprising:

said image pickup unit; and a control device that determines a state of white defects which appears in the subject image field formed by the image signal output by the image pickup unit operating at a slow shutter speed and stops a function of correcting a shake of the subject image when the state of the white defects is determined to be at a higher level than a predetermined level.

2. A shake correcting device for correcting a shake of a subject image, by processing an image signal which is output by an image pickup unit that converts the subject image into the image signal, the shake correcting device comprising:

said image pickup unit; and a control device that stops a function of correcting a shake of the subject image when an image pickup time by the image pickup unit exceeds a predetermined period of time, wherein the image pickup time of the image pickup unit is an electric charge accumulation time over which a light quantity of the subject image that is received by the image pickup unit is a accumulated as an electric charge.

3. A shake correcting device according to claim 2, wherein the predetermined period of time is the image pickup time which white defects are expected to be created.

4. An image pickup apparatus comprising a shake correcting device for correcting a shake of a subject image, by processing an image signal which is output by an image pickup unit that converts the subject image into the image signal, the image pickup apparatus comprising:

said image pickup unit; and a control device that determines a state of white defects which appears in the subject image field formed by the image signal output by the image pickup unit operated at a slow speed and stops a function of correcting a shake of the subject image when the state of the white defects is determined to be at a higher level than a predetermined level.

5. An image pickup apparatus comprising a shake correcting device for correcting a shake of a subject image, by processing an image signal which is output by an image pickup unit that converts the subject image into the image signal, the image pickup apparatus comprising:

said image pickup unit; and a control device that stops a function of correcting a shake of the subject image when an image pickup time by the image pickup unit exceeds a predetermined period of time, wherein the image pickup time of the image pickup unit is an electric charge accumulation time over which a light quality of the subject image that is received by the image pickup unit is accumulated as an electric charge.

6. An image pickup apparatus according to claim 5, wherein the predetermined period of time is the image pickup time which white defects are expected to be created.

7. A shake correcting method for correcting a shake of a subject image, by processing an image signal which is output by an image pickup unit that converts the subject image into the image signal, the shake correcting method comprising:

determining a state of white defects which appears in the subject image field formed by the image signal output by the image pickup unit operated at a slow speed; and stopping a function of correcting a shake of the subject image when the state of the white defects is determined in said determining step to be at a higher level than a predetermined level.

8. A shake correcting method for correcting a shake of a subject image, by processing an image signal which is output by an image pickup unit that converts the subject image into the image signal, the shake correcting method comprising:

stopping a function of correcting a shake of the subject image when an image pickup time of the image pickup unit exceeds a predetermined period of time, wherein the image pickup time of the image pickup unit is an electric charge accumulation time over which a light quantity of the subject image that is received by the image pickup unit is accumulated as an electric charge.

9. A shake correcting method according to claim 8, wherein the predetermined period of time is the image pickup time which white defects are expected to be created.

10. A program for implementing a shake correcting method for correcting a shake of a subject image, by processing an image signal which is output by an image pickup unit that converts the subject image into the image signal, the program comprising:

a determining module for determining a state of white defects which appears in the subject image field formed by the image signal output by the image pickup unit operated at a slow speed, and a control module for stopping a function of correcting a shake of the subject image when the state of the white defects is determined to be at a higher level than a predetermined level.

11. A program for implementing a shake correcting method for correcting a shake of a subject image, by processing an image signal which is output by an image pickup unit that converts the subject image into the image signal, the program comprising:

a control module for stopping a function of correcting a shake of the subject image when an image pickup time of the image pickup unit exceeds a predetermined period of time, wherein the image pickup time of the image pickup unit is an electric charge accumulation time over which a light quantity of the subject image that is received by the image pickup unit is accumulated as an electric charge.

12. A program for implementing a shake connecting method according to claim 10, wherein the predetermined period of time is the image pickup time which white defects are expected to be created.

13. A computer-readable storage medium storing a program for implementing a shake correcting method for correcting a shake of a subject image, by processing an image signal which is output by an image pickup unit that converts the subject image into the image signal, wherein the program comprises:

a determining module for determining a state of white defects which appears in the subject image field formed by the image signal output by the image pickup unit operated at a slow speed, and a control module for stopping a function of correcting a shake of the subject image when the state of the white defects is determined to be at a higher level than a predetermined level.

14. A computer-readable storage medium storing a program for implementing a shake correcting method for correcting a shake of a subject image, by processing an image signal which is output by an image pickup unit that converts the subject image into the image signal, wherein the program comprises:

a control module for stopping a function of correcting a shake of the subject image when an image pickup time of the image pickup unit exceeds a predetermined period of time, wherein the image pickup time of the image unit is an electric charge accumulation time over which a light quantity of the subject image that is received by the image pickup unit is accumulated as an electric charge.

15. A computer readable storage medium storing a program for implementing a shake correcting method according to claim 14, wherein the predetermined period of time is the image pickup lime which white defects are expected to be created.

16. A shake correcting device for correcting a shake of a subject image, by processing an image signal which is output by an image pickup unit that converts the subject image into the image signal, the shake correcting device comprising:

said image pickup unit; and a control device that determines a state of white defects which appears in the subject image field formed by the image signal and stops a function of correcting a shake of the subject image when at least one of conditions is satisfied, the conditions including a condition that the state of the white defects is determined to be at a higher level than a predetermined level, and a condition that an image pickup time by the image pickup unit exceeds a predetermined period of time.

17. An image pickup apparatus comprising a shake correcting device for correcting a shake of a subject image, by processing an image signal which is output by an image pickup unit that converts the subject image into the image signal, the image pickup apparatus comprising:

said image pickup unit; and a control device that determines a state of white defects which appears in the subject image field formed by the image signal and stops a function of correcting a shake of the subject image when at least one of conditions is satisfied, the conditions including a condition that the state of the white defects is determined to be at a higher level than a predetermined level, and a condition that an image pickup time by the image pickup unit exceeds a predetermined period of time.

18. A shake correcting method for correcting a shake of a subject image, by processing an image signal which is output by an image pickup unit that converts the subject image into the image signal, the shake correcting method comprising:

determining a state of white defects which appears in the subject image field formed by the image signal; and stopping a function of correcting a shake of the subject image when at least one of conditions is satisfied, the conditions including a condition that the state of the white defects is determined to be at a higher level than a predetermined level, and a condition that an image pickup time by the image pickup unit exceeds a predetermined period of time.

19. A new program for implementing a shake correcting method for correcting a shake of a subject image, by processing an image signal which is output by an image pickup unit that converts the subject image into the image signal, the program comprising:

a determining module for determining a state of white defects which appears in the subject image field funned by the image signal, and a control module fur stopping a function of correcting a shake of the subject image when at least one of conditions is satisfied, the conditions including a condition that the state of the white defects is determined to be at a higher level than a predetermined level, and a condition that an image pickup time by the image pickup unit exceeds a predetermined period of time.

20. A computer-readable storage medium storing a program for implementing a shake correcting method for correcting a shake of a subject image, by processing an image signal which is output by an image pickup unit that converts the subject image into the image signal, wherein the program comprises:

a determining module for determining a state of white defects which appears in the subject image field formed by the image signal, and a control module for stopping a function of correcting a shake of the subject image when at least one of conditions is satisfied, the conditions including a condition that the state of the white defects is determined to be at a higher level than a predetermined level, and a condition that an image pickup time by the image pickup unit exceeds a predetermined period of time.

* * * * *

UNITED STATES PATENT AND TRADEMARK OFFICE
CERTIFICATE OF CORRECTION

PATENT NO. : 6,778,767 B2
DATED : August 17, 2004
INVENTOR(S) : Tatsuya Yamazaki It is certified that error appears in the above-identified patent and that said Letters Patent is hereby corrected as shown below:

Column 14,
Line 16, delete "claim 10" and insert -- claim 11 --.

Column 16,
Line 5, delete "field funned" and insert -- field formed --.

Signed and Sealed this

Twenty-eighth Day of March, 2006

JON W. DUDAS
*Director of the United States Patent and Trademark Office*